(12) United States Patent
Yoon et al.

(10) Patent No.: US 6,484,623 B1
(45) Date of Patent: Nov. 26, 2002

(54) BAKING APPARATUS WITH TOASTER

(75) Inventors: Chong-Man Yoon, Seoul (KR);
Jong-Deuk Jeong, Busan (KR);
Jin-Kook Park, Busan (KR)

(73) Assignee: Kaiser Electronics Co., Ltd. (KR)

( * ) Notice: Subject to any disclaimer, the term of this patent is extended or adjusted under 35 U.S.C. 154(b) by 0 days.

(21) Appl. No.: 10/092,344

(22) Filed: Mar. 6, 2002

(30) Foreign Application Priority Data

Jan. 5, 2002 (KR) .................................. 2002-567

(51) Int. Cl.[7] .................. A47J 27/00; A47J 27/62; A47J 37/01; A47J 37/08; A23L 1/00
(52) U.S. Cl. .................. 99/326; 99/329 R; 99/331; 99/339; 99/348; 99/357; 99/385; 99/391; 99/400; 366/144; 366/146; 366/314
(58) Field of Search .................. 99/325–335, 339, 99/340, 348, 357, 368, 385–391, 400, 401, 444–446, 448, 467, 468, 483, 484, 486; 366/69, 96–98, 144–146, 149, 341, 314, 601; 426/504, 512, 231, 233, 523; 219/400, 521

(56) References Cited

U.S. PATENT DOCUMENTS

| | | | | |
|---|---|---|---|---|
| 5,156,637 A | * | 10/1992 | Wai-Ching | 99/391 X |
| 5,493,955 A | * | 2/1996 | Belongia et al. | 99/348 |
| 5,531,153 A | * | 7/1996 | Maruyama et al. | 99/327 |
| 5,664,481 A | * | 9/1997 | Huggler | 99/328 |
| 5,735,190 A | * | 4/1998 | Sham | 99/327 |
| 5,778,766 A | * | 7/1998 | Wang | 99/326 |
| 5,836,237 A | * | 11/1998 | Chiang | 99/348 |
| 5,967,021 A | * | 10/1999 | Yung | 99/327 |
| 6,029,564 A | * | 2/2000 | Huang | 99/331 |
| 6,080,963 A | * | 6/2000 | Huang | 99/331 |
| 6,186,053 B1 | * | 2/2001 | Nakano et al. | 99/327 |
| 6,196,113 B1 | * | 3/2001 | Yung | 99/327 |
| 6,217,924 B1 | * | 4/2001 | Sit et al. | 426/233 |

* cited by examiner

Primary Examiner—Timothy F. Simone
(74) Attorney, Agent, or Firm—Harness, Dickey & Pierce, P.L.C.

(57) ABSTRACT

A baking apparatus with a toaster comprises a main body; a baking part disposed at one side of the main body, and having a lid mounted at an upper portion thereof so as to be opened and closed by a hinge, a pot mounting portion for receiving a pot, a first heat generator formed at an inside wall of the pot mounting portion, and a rotational shaft protruded at a lower center portion of the pot mounting portion so that a stirring wing is inserted thereon; a toasting part disposed at the other side of the main body, and having a toasting chamber for receiving a slice of bread, a second heat generator formed at an inside wall of the toasting chamber, a lever for applying power source to the second heat generator and guiding the slice of bread, a crumb tray for removing bread crumbs, a driving motor for driving the rotational shaft of the baking part, and an operating portion for applying the power source to the driving motor and the first heat generator.

6 Claims, 6 Drawing Sheets

BAKING APPARATUS WITH TOASTER

TECHNICAL FIELD

The present invention relates to a baking apparatus with a toaster, and more particularly, to a baking apparatus with a toaster for baking bread and toasting the bread using one apparatus.

BACKGROUND ART

Generally, when baking bread at home, first, a user opens a lid of a baking apparatus, and separates a pot using a handle, and then fixedly disposes a stirring wing at an internal center portion of the baking apparatus.

Then, after putting ingredients of the bread in the pot, the user disposes again the pot in the baking apparatus, and closes the lid to stir the ingredients, and then applies power to a heat generator to bake the bread.

Further, in order to toast the bread, the user inserts a slice of the bread into a toasting chamber, and then pulls an operating lever to toast the bread.

However, in the conventional baking apparatus and the toaster, there are following problems:

In order to use the baking apparatus and the toaster, the user has to purchase each of them, and also bake and toast the bread separately using the two electric appliances.

In addition, since the baking apparatus and the toaster are separately fabricated, there is a disadvantage in keeping and using of each appliance. And there is a further disadvantage in that spatial efficiency is lowered due to a space occupied by the appliances.

DISCLOSURE OF THE INVENTION

Therefore, an object of the invention is to a baking apparatus with a toaster, in which the baking apparatus for baking bread and the toaster for toasting the bread are integrally formed in one body so as to be independently used, thereby improving a spatial limitation and saving a time.

To accomplish the object, the present invention provides a baking apparatus with a toaster, comprising a main body; a baking part disposed at one side of the main body, and having a lid mounted at an upper portion thereof so as to be opened and closed by a hinge, a pot mounting portion for receiving a pot, a first heat generator formed at an inside wall of the pot mounting portion, and a rotational shaft protruded at a lower center portion of the pot mounting portion so that a stirring wing is inserted thereon; a toasting part disposed at the other side of the main body, and having a toasting chamber for receiving a slice of bread, a second heat generator formed at an inside wall of the toasting chamber, a lever for applying power source to the second heat generator and guiding the slice of bread, a crumb tray for removing bread crumbs, a driving motor for driving the rotational shaft of the baking part, and an operating portion for applying the power source to the driving motor and the first heat generator.

BRIEF DESCRIPTION OF THE DRAWINGS

The above object, other features and advantages of the present invention will become more apparent by describing the preferred embodiment thereof with reference to the accompanying drawings, in which.

BEST MODE FOR CARRYING OUT THE INVENTION

Now, preferred embodiments of the present invention will be described in detail with reference to the annexed drawings.

Figure 1:
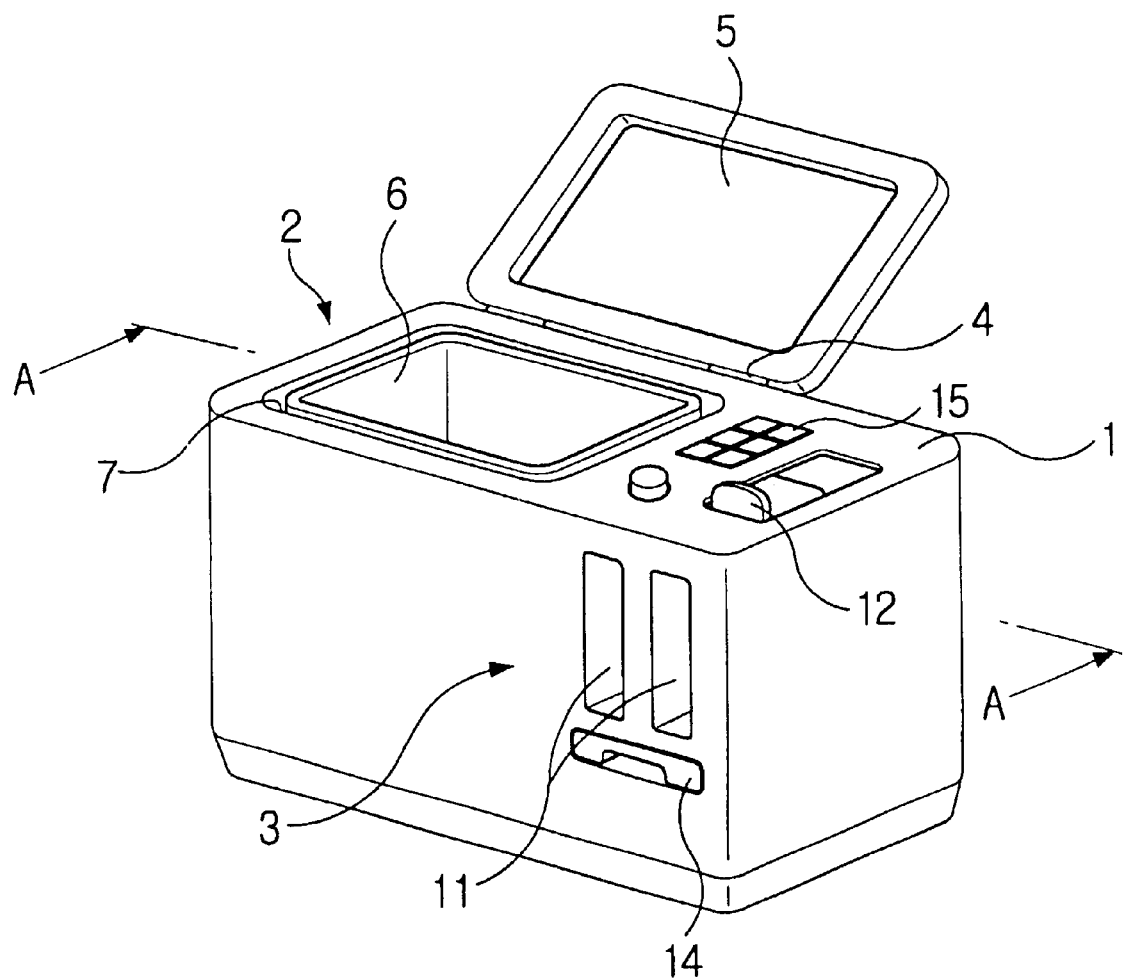
FIG. 1 is a perspective view of a baking apparatus with a toaster according to an embodiment of the present invention.
Figure 2:
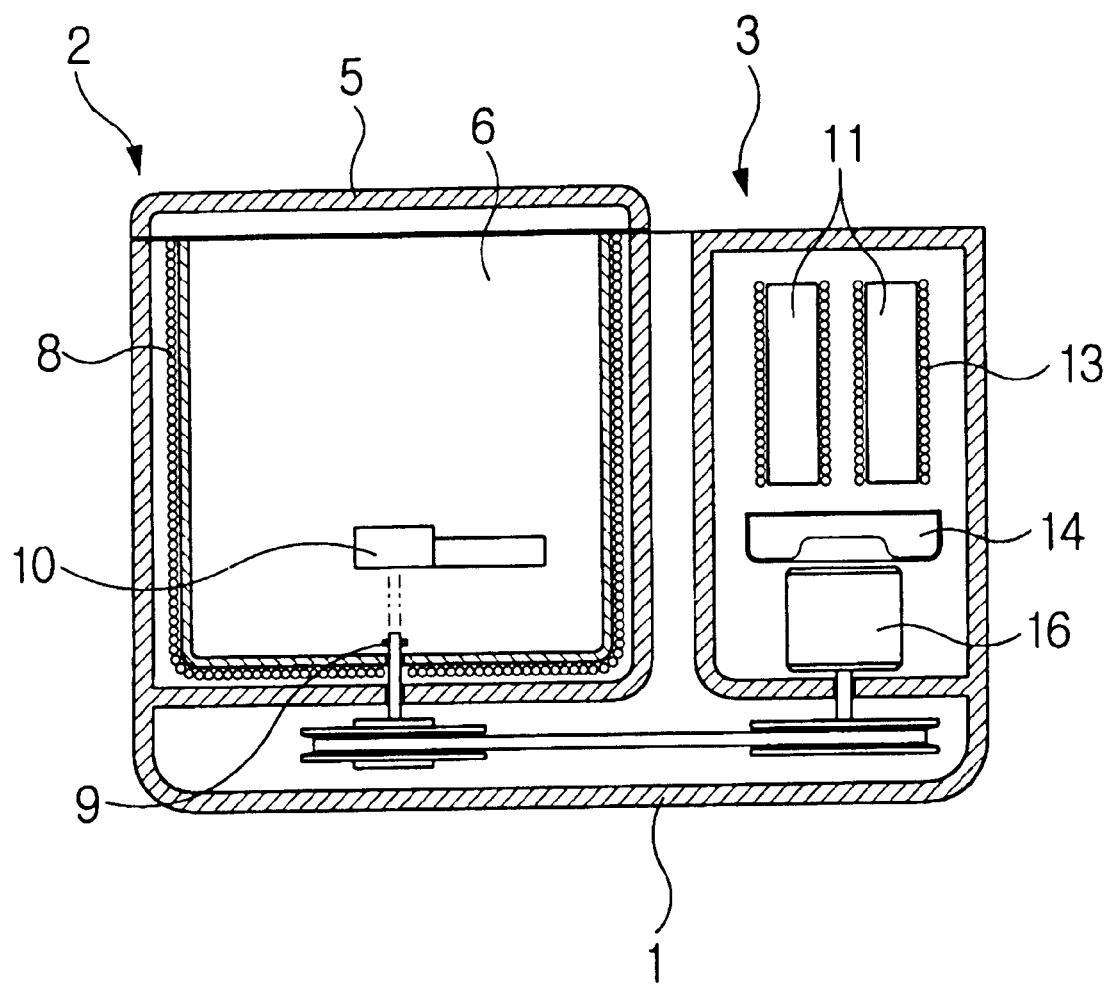
FIG. 2 is a cross-sectional view taken along the line A—A of FIG. 1.
Figure 3:
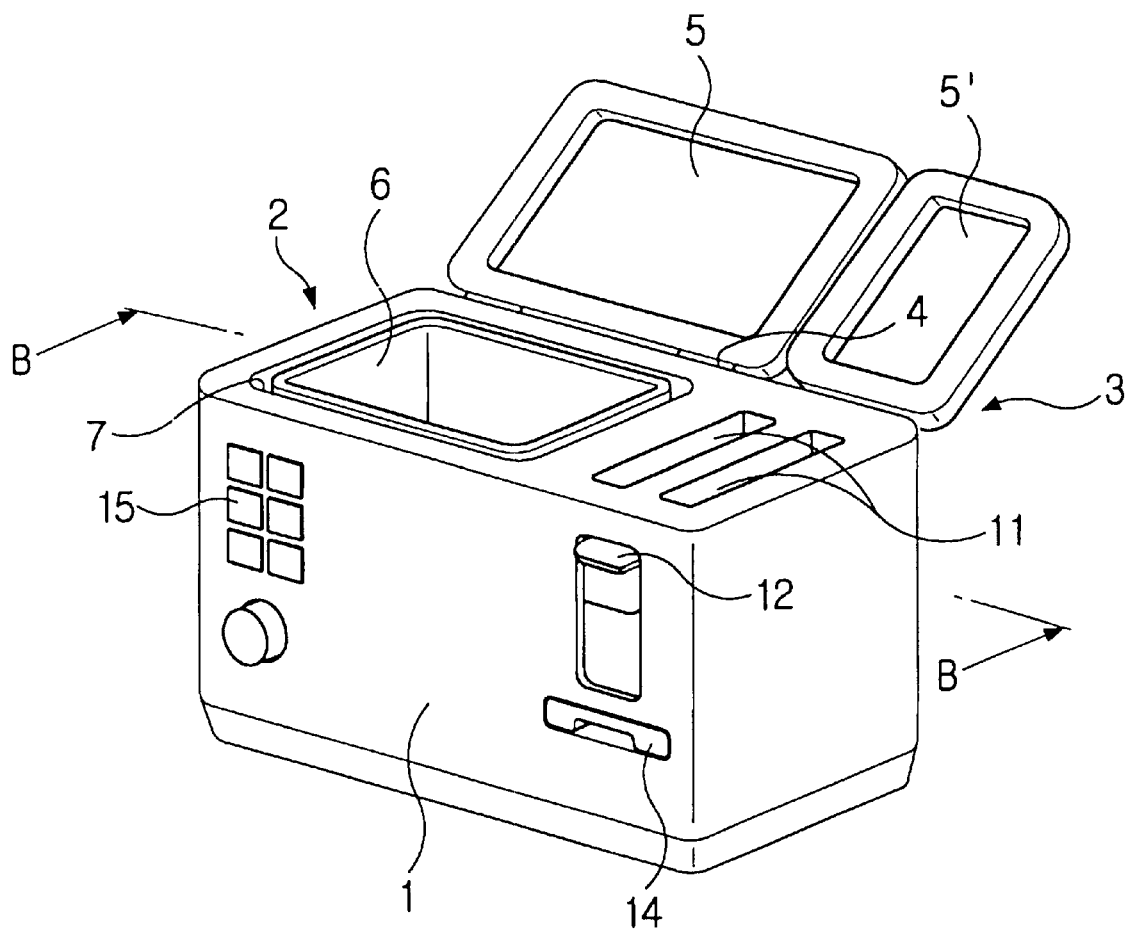
FIG. 3 is a perspective view of the baking apparatus with the toaster according to another embodiment of the present invention.
Figure 4:
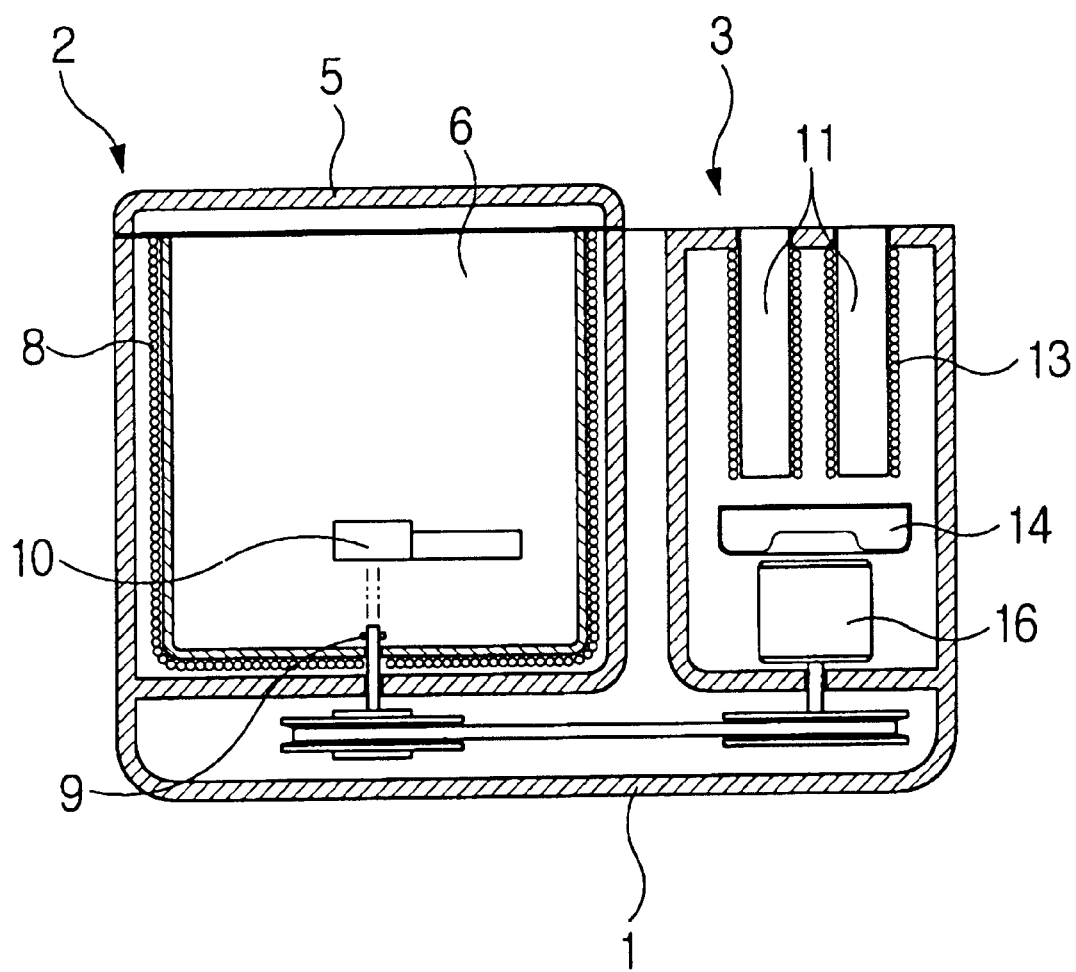
FIG. 4 is a cross-sectional view taken along the line B—B of FIG. 3.
Figure 5:
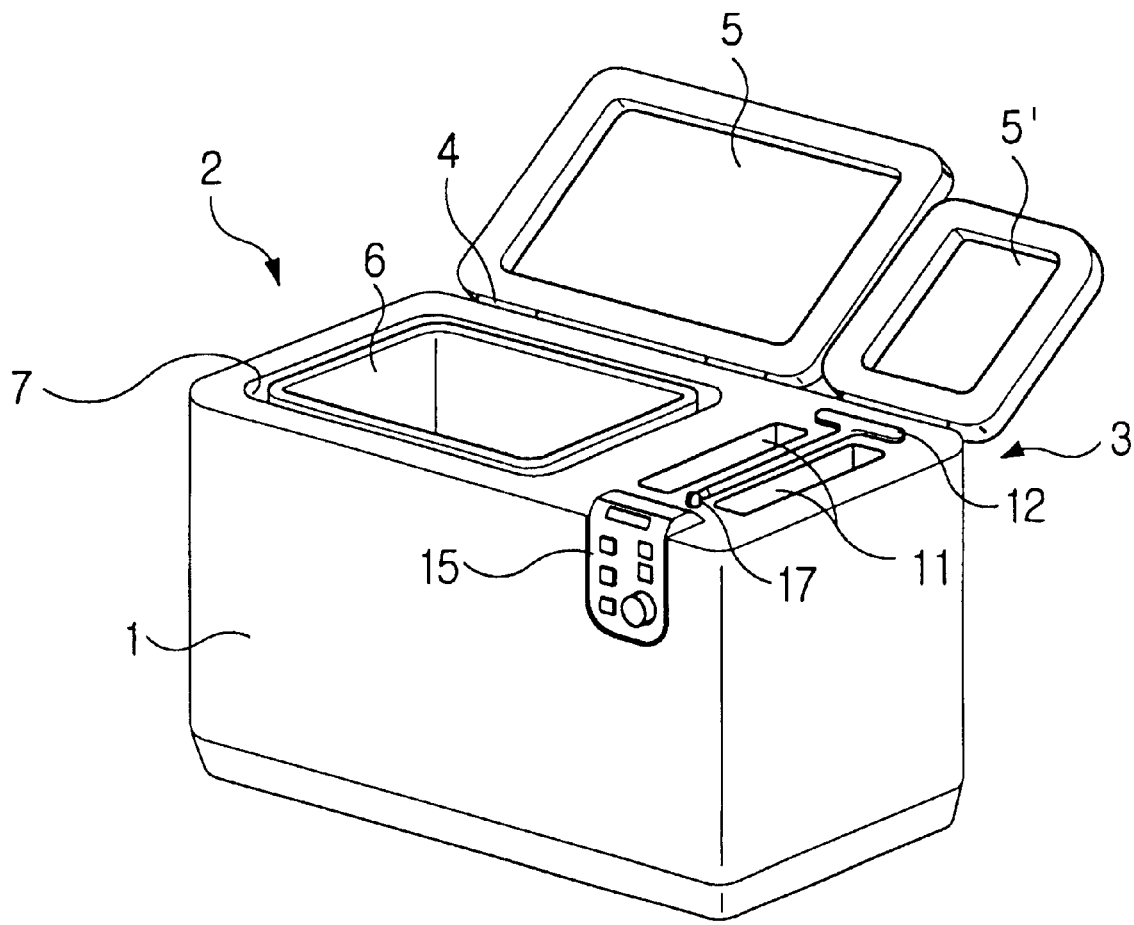
FIG. 5 is a perspective view of the baking apparatus with the toaster according to another embodiment of the present invention.
Figure 6:
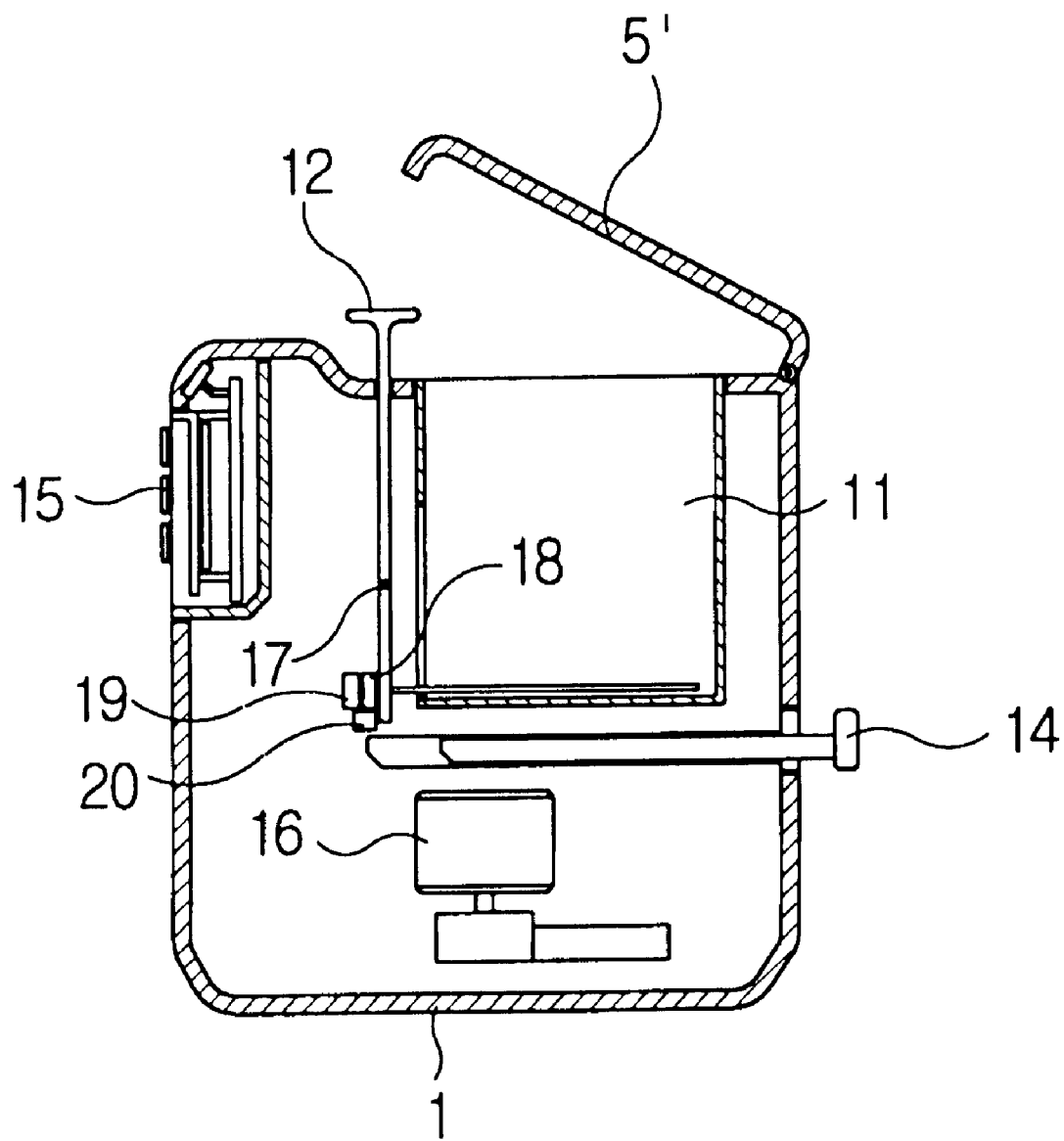
FIG. 6 is a side sectional view of a main portion of FIG. 5.

FIG. 1 is a perspective view of a baking apparatus with a toaster according to an embodiment of the present invention; FIG. 2 is a cross-sectional view taken along the line A—A of FIG. 1; FIG. 3 is a perspective view of the baking apparatus with the toaster according to another embodiment of the present invention; FIG. 4 is a cross-sectional view taken along the line B—B of FIG. 3; FIG. 5 is a perspective view of the baking apparatus with the toaster according to another embodiment of the present invention; FIG. 6 is a side sectional view of a main portion of FIG. 5.

In FIGS. 1 to 6, at one side of a main body 1, there is provided a baking apparatus 2. A lid 5 is disposed at an upper portion of the baking apparatus 2 interposing a hinge 4 therebetween so as to open or close the upper portion of the baking apparatus 2. At an inner portion of the baking apparatus 2, there is formed a pot mounting portion 7 in which a pot 6 for receiving ingredients of bread is mounted.

A first heat generator 8 is disposed between inner walls of the pot mounting portion 7 and the main body 1. And at an inner center portion of the pot 6, there is protruded a rotational shaft 9 on which a stirring wing 10 is detachably inserted.

At other side of the main body 1, there is provided a toaster 3. A toasting chamber 11 of the toaster 3 is formed at a side surface or an upper surface of the main body 1.

Further, at the side surface or upper surface of the main body 1, in which the toasting chamber is formed, there is slidably formed a lever 12 for operating the toaster 3. And, a second heat generator 13 is disposed between the main body 1 and the toasting chamber 11.

A hinge 17 may be provided at a middle portion of the lever 12 so that the lever 12 is bent and then laid on the upper surface of the main body 1, as shown in FIG. 5.

A crumb tray 14 for removing bread crumbs is slidably mounted in a front surface or a rear surface of the main body 1. At a lower side of the crumb tray 14, there is mounted a driving motor 16 for receiving power source by an operating portion 15 formed at the main body 1 and transmitting driving power to the rotational shaft 9 of the baking apparatus 2.

Moreover, the first and second heat generator 8 and 13 are also connected to the operating portion 15 so as to receive the power source and generate heat for baking and toasting the bread.

At a lower side portion of the lever 12, there is formed a moving terminal 18. If the lever 12 is slid, the moving terminal 18 is contacted with a fixing terminal 19 mounted in the main body 1 to apply the power source to the toaster 3.

The moving and fixing terminals 18 and 19 are connected or disconnected each other by an electromagnet 20 mounted in the main body 1.

Hereinafter, an operation of the baking apparatus with-the toaster according to the present invention will be described fully.

First, a user opens the lid 5 of the baking apparatus 2, and separates a pot 6 using a handle, and put the ingredients of the bread in the pot 6.

Then, after mounting again the pot 6 in the pot mounting portion 7, the user fixedly inserts the stirring wing 10 onto the rotational shaft 9, and closes the lid 5 to perform a stirring operation. After completing the stirring operation, the user operates the operating portion 15 to apply the power source to the baking apparatus 2 and bake the bread.

And, the user slices the bread baked by the baking apparatus 2 using a bread knife, and inserts a slice of the bread into the toasting chamber 11 of the toaster 3. Then, if the user slides the lever 12, the moving terminal 18 disposed at the lower side of the lever 12 is interlocked and then contacted with the fixing terminal 19 mounted in the main body 1. Therefore, the power source is applied to the toaster 3, so that the bread is toasted.

At this time, the electromagnet 20 prevents the separation of the moving and fixing terminals 18 and 19. After a desired time is passed, the operating portion 15 transfers a signal to the electromagnet 20 so that the moving and fixing terminals 18 and 19 are separated. Therefore, the toasting operation is finished.

As apparent from the above description, the baking apparatus for baking the bread and the toaster for toasting the bread are integrally formed in one body, thereby baking and toasting the bread using one electric appliance and thus providing convenience to the user and improving spatial efficiency.

We claim:

1. A baking apparatus with a toaster, comprising:

a main body;

a baking part disposed at one side of the main body, and having a lid mounted at an upper portion thereof so as to be opened and closed by a hinge, a pot mounting portion for receiving a pot, a first heat generator formed at an inside wall of the pot mounting portion, and a rotational shaft protruded at a lower center portion of the pot mounting portion so that a stirring wing is inserted thereon;

a toasting part disposed at the other side of the main body, and having a toasting chamber for receiving a slice of bread, a second heat generator formed at an inside wall of the toasting chamber, a lever for applying power source to the second heat generator and guiding the slice of bread, a crumb tray for removing bread crumbs, a driving motor for driving the rotational shaft of the baking part, and an operating portion for applying the power source to the driving motor and the first heat generator.

2. The apparatus, according to claim 1, wherein the operating portion and the lever are formed at an upper surface of the other side of the main body, and the toasting chamber and the crumb tray are formed at a front surface of the main body.

3. The apparatus, according to claim 1, wherein the operating portion, the lever and the crumb tray are formed at the front surface of the main body, and the toasting chamber is formed at the upper surface of the other side of the main body.

4. The apparatus, according to claim 1, wherein the operating portion is formed at the front surface of the main body, and the lever and the toasting chamber are formed at the upper surface of the other side portion of the main body, and the crumb tray is formed at a rear surface of the main body.

5. The apparatus, according to one of claims 1 to 4, wherein a moving terminal formed at a lower side of the lever is slid by the lever so as to be contacted with a fixing terminal and thus apply the power source to the toasting part, and the moving and fixing terminals are connected or disconnected by an electromagnet.

6. The apparatus, according to claim 4, wherein the lever has a hinge at a middle portion thereof so as to be bent and laid on the upper surface of the other side of the main body.

* * * * *